(12) United States Patent
Kawai (10) Patent No.: US 8,119,266 B2
(45) Date of Patent: Feb. 21, 2012

(54) MAGNETIC RECORDING MEDIUM SUBSTRATE, MAGNETIC RECORDING MEDIUM, METHOD FOR MANUFACTURING MAGNETIC RECORDING MEDIUM SUBSTRATE, AND METHOD FOR MANUFACTURING MAGNETIC RECORDING MEDIUM

(75) Inventor: Hideki Kawai, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 9 days.

(21) Appl. No.: 12/448,712

(22) PCT Filed: Oct. 31, 2007

(86) PCT No.: PCT/JP2007/071206
§ 371 (c)(1),
(2), (4) Date: Jul. 1, 2009

(87) PCT Pub. No.: WO2008/084591
PCT Pub. Date: Jul. 17, 2008

(65) Prior Publication Data
US 2010/0007990 A1    Jan. 14, 2010

(30) Foreign Application Priority Data
Jan. 9, 2007    (JP) .................. 2007-001745

(51) Int. Cl.
*G11B 5/82* (2006.01)
*G11B 5/84* (2006.01)
*B05D 7/00* (2006.01)
*C23C 18/00* (2006.01)
(52) U.S. Cl. .................. 428/836.1; 428/848.1; 360/135; 29/603.13; 427/132; 369/94

(58) Field of Classification Search ............... 428/836.1, 428/848, 831.2, 848.5, 826, 836.2, 832.1, 428/848.2, 848.1, 817, 64.4; 360/134, 135, 360/69; 29/604, 603.13, 737, DIG. 28; 369/47.49, 369/47.1, 59.11, 94; 427/264, 266, 272, 427/129, 132; 430/270.11, 302, 322, 323
See application file for complete search history.

(56) References Cited

U.S. PATENT DOCUMENTS
4,657,824 A    4/1987    Howard
(Continued)

FOREIGN PATENT DOCUMENTS
EP    0 220 597 B1    1/1990
(Continued)

OTHER PUBLICATIONS

International Search Report in International Application No. PCT/JP2007/071206, dated Jan. 22, 2008, 4 pages.

*Primary Examiner* — Kevin M. Bernatz
*Assistant Examiner* — Louis Falasco
(74) *Attorney, Agent, or Firm* — Brinks Hofer Gilson & Lione (57) ABSTRACT

Provided are a magnetic recording medium substrate whereupon a magnetic layer can be regularly formed in a recording area, a magnetic recording medium and a method for manufacturing the magnetic recording medium substrate. A plurality of recording areas wherein the magnetic layer is to be formed are formed on the surface of the disk-shaped magnetic recording medium substrate. The size of the recording area is an integral multiple of a lattice constant of a unit lattice of a single crystal structure constituting the magnetic layer. For instance, the width of a protruding section (3) to be used as the recording area is an integral multiple of the lattice constant of the unit lattice of the single crystal structure configuring the magnetic layer.

28 Claims, 4 Drawing Sheets

U.S. PATENT DOCUMENTS

| | | | |
|---|---|---|---|
| 6,689,497 B1* | 2/2004 | Girt | 428/832.1 |
| 6,706,426 B1* | 3/2004 | Yamamoto et al. | 428/831.2 |
| 2002/0086185 A1* | 7/2002 | Yasui et al. | 428/848.1 |
| 2003/0157373 A1* | 8/2003 | Kirino et al. | 428/848 |
| 2004/0043335 A1* | 3/2004 | Krause et al. | 430/323 |
| 2005/0079448 A1* | 4/2005 | Nakada et al. | 430/323 |
| 2005/0136209 A1* | 6/2005 | Chin et al. | 428/64.4 |
| 2006/0002026 A1* | 1/2006 | Stipe et al. | 360/135 |
| 2006/0044687 A1* | 3/2006 | Soeno et al. | 360/135 |
| 2006/0061900 A1* | 3/2006 | Ohtsuka et al. | 360/135 |
| 2006/0141293 A1* | 6/2006 | Gouke | 428/831.2 |
| 2006/0204794 A1* | 9/2006 | Kikuchi et al. | 428/836.2 |
| 2006/0210840 A1* | 9/2006 | Kamisawa et al. | 428/848.5 |
| 2006/0222896 A1* | 10/2006 | Inomata et al. | 428/826 |
| 2006/0269791 A1* | 11/2006 | Okawa et al. | 427/129 |
| 2007/0009766 A1* | 1/2007 | Lu et al. | 428/836.1 |
| 2007/0211592 A1* | 9/2007 | Sakurai et al. | 369/47.49 |
| 2008/0075980 A1* | 3/2008 | Ambrose et al. | 428/831.2 |

FOREIGN PATENT DOCUMENTS

| | | |
|---|---|---|
| JP | 62-102419 A | 5/1987 |
| JP | 05-028488 | 2/1993 |
| JP | 05-314453 A | 11/1993 |
| JP | 2003-296912 A | 10/2003 |
| JP | 2005-220436 A | 8/2005 |
| JP | 2005-293633 | 10/2005 |
| WO | WO 2008/084591 A1 | 7/2008 |

* cited by examiner

FIG. 6

MAGNETIC RECORDING MEDIUM SUBSTRATE, MAGNETIC RECORDING MEDIUM, METHOD FOR MANUFACTURING MAGNETIC RECORDING MEDIUM SUBSTRATE, AND METHOD FOR MANUFACTURING MAGNETIC RECORDING MEDIUM This application is a National Stage of International Application PCT/JP2007/071206 filed with Japanese Patent Office on Oct. 31, 2007.

TECHNICAL FIELD

The present invention relates to a magnetic recording medium substrate used as a substrate for a magnetic disk recording apparatus, a magnetic recording medium, and a method for manufacturing the magnetic recording medium substrate.

BACKGROUND ART

It is a trend to increase the storage capacity of a magnetic recording apparatus such as a hard disk drive (HDD) has been expanding, and the vertical recording method is coming into practical use as a recording method.

In this vertical recording method, recording is performed by magnetization in the direction perpendicular to the surface of a recording layer of a magnetic recording medium. This method provides high-density recording. In the vertical recording method, however, for the recording density of 100 Gbit/inch$^2$ or higher, the adjacent track gets magnetized by the side fringing occurring on the side surfaces of the magnetic head, with the result that write or read error will occur.

To solve this problem, a so-called a discrete track medium (hereinafter referred to as "DT medium") has been proposed, wherein the tracks are physically separated from each other by non-magnetic areas (non-recording areas) in which data writing is impossible (Patent Document 1 and Patent Document 2). This DT medium has a non-magnetic area (non-recording area) provided between the tracks, and successfully solves the following problems inherent to the magnetic recording medium capable of high-density recording. Data is written accidentally in the adjacent track. Data is read out accidentally from the adjacent track at the time of reproduction. The output is reduced due to the signal noise produced by the magnetic curvature of the recording bit end portion.

Patent Document 1: Japanese Unexamined Patent Application Publication No. 5-28488

Patent Document 2: Japanese Unexamined Patent Application Publication No. 2005-293633

DISCLOSURE OF THE INVENTION

OBJECT OF THE INVENTION

In the magnetic layer formed on each track, however, the unit lattice of the crystal structure constituting the magnetic layer is not necessarily formed regularly. For example, unit lattices may not be formed regularly on the end portions of the track. In this case, distortion may occur in the magnetic layer, or the portion where unit lattices are not regularly formed may be nonmagnetic, with the result that desired magnetic properties (including coercive force or reproduction output) will not be obtained. In addition, magnetic noise may occur, and recording and reproduction characteristics will be thus much deteriorated.

An object of the present invention is to solve the aforementioned problems and to provide a magnetic recording medium substrate capable of regular formation of a magnetic layer in a recording area, a magnetic recording medium, and a method for manufacturing the magnetic recording medium substrate.

Means For Solving The Object

A first aspect of the present invention is a magnetic recording medium substrate which is a disk-shaped magnetic recording medium which has on a surface thereof a plurality of recording areas in which a magnetic layer is to be formed, wherein the recording areas have a dimension of an integral multiple of a lattice constant of a unit lattice of a single crystal structure constituting the magnetic layer.

A second aspect of the present invention is the magnetic recording medium substrate according to the first aspect, wherein the surface has grooves formed thereon, the recording areas are provided on recessed portions of the grooves, and the recessed portions have a width of an integral multiple of the lattice constant of the unit lattice.

A third aspect of the present invention is the magnetic recording medium substrate according to the first aspect, wherein the surface has grooves formed thereon, the recording areas are provided on protruding portions of the grooves, and the protruding portions have a width of an integral multiple of the lattice constant of the unit lattice.

A forth aspect of the present invention is the magnetic recording medium substrate according to the second or third aspect, wherein the grooves are formed in a combination of identical geometric shapes or a combination of a plurality of geometric shapes.

A fifth aspect of the present invention is the magnetic recording medium substrate according to the forth aspect, wherein the geometric shape is a pattern selected from the group of patterns consisting of a lattice pattern, a radial pattern, a concentric pattern and a honeycomb pattern.

A sixth aspect of the present invention is the magnetic recording medium substrate according to any one of the first through fifth aspects, wherein the recording areas are formed by a molding method.

A seventh aspect of the present invention is the magnetic recording medium substrate according to any one of the first through fifth aspects, wherein the recording areas are formed by patterning.

A eighth aspect of the present invention is the magnetic recording medium substrate according to any one of the first through seventh aspects, wherein a base material of the substrate is composed of material selected from the group of materials consisting of resin, glass, metal, semiconductor, oxide, nitride, and sulfide.

A ninth aspect of the present invention is a magnetic recording medium, comprising:
a magnetic recording layer formed in the recording areas of the magnetic recording medium substrate according to any one of the first through eighth aspects.

A tenth aspect of the present invention is a method for manufacturing a magnetic recording medium substrate wherein a plurality of recording areas in which a magnetic layer is to be formed are formed on a surface of the disk-shaped substrate,
wherein the recording areas have a dimension of an integral multiple of a lattice constant of a unit lattice of a single crystal structure constituting the magnetic layer.

EFFECTS OF THE INVENTION

According to the present invention, the size of the recording area on the substrate surface is an integral multiple of the lattice constant of the unit lattice of a single crystal structure constituting the magnetic layer. This arrangement allows the regular magnetic layer to be formed in the recording area without requiring a complicated process. This produces a magnetic layer with little distortion, and thereby improving the magnetic properties of a magnetic recording medium.

Further, according to the present invention, the crystal is regularly arranged inside the recording bit also in the case of a pattered medium in which the recording bits are separated each other in order to enhance the recording density. Thus, a defect-free single crystal structure is formed in the bit, so that a stable magnetic domain is realized, with the result that excellent magnetic properties are ensured.

DESCRIPTION OF THE NUMERALS

1, 5: Magnetic recording medium substrate
2, 6: Recessed portion
3, 7: Protruding portion
10, 20: Magnetic recording medium
11, 21: Magnetic layer
11a: Unit lattice

BEST MODE FOR CARRYING OUT THE INVENTION

Embodiment 1

Figure 1:
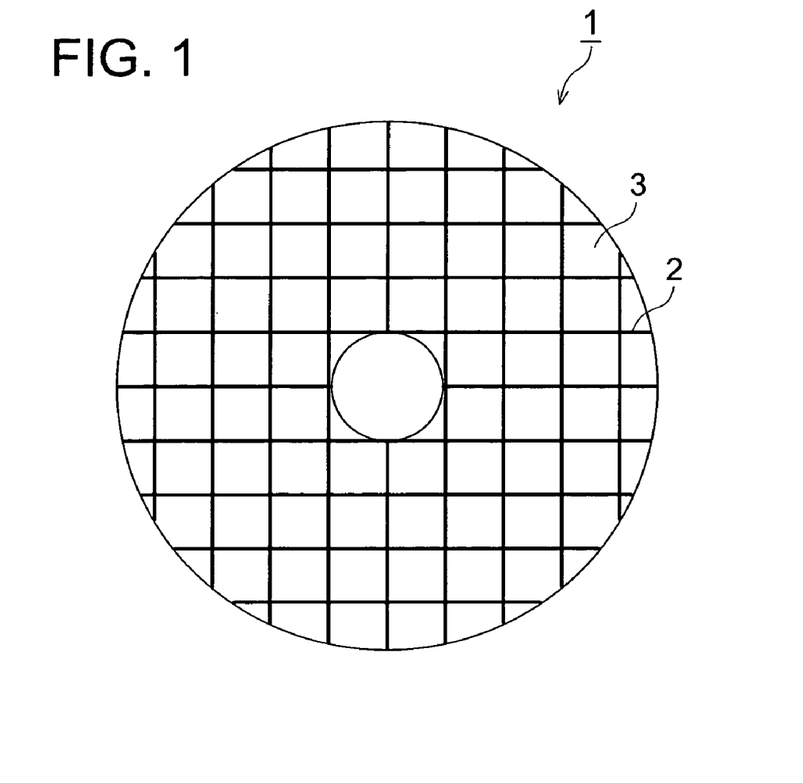
FIG. 1 shows a top view of a magnetic recording medium substrate according to a first embodiment of the present invention.
Figure 2:
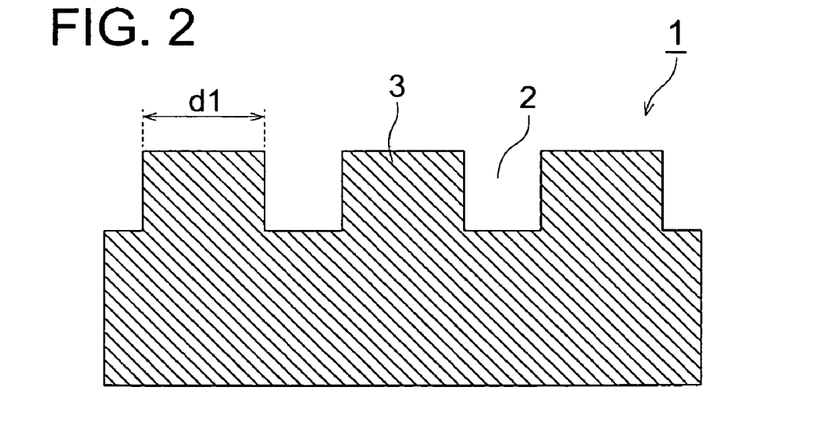
FIG. 2 shows a cross sectional view of the magnetic recording medium substrate according to a first embodiment of the present invention.

Referring to FIGS. 1 through 4, the following describes the magnetic recording medium substrate in the first embodiment: FIG. 1 shows a top view of a magnetic recording medium substrate according to a first embodiment of the present invention. FIG. 2 shows a cross sectional view of the magnetic recording medium substrate according to the first embodiment of the present invention.

The magnetic recording medium substrate 1 is designed in a disk-shaped configuration. The magnetic recording medium substrate 1 has a through-hole formed at the center and is used as a substrate of the magnetic recording medium such as a hard disk. As shown in FIG. 1, intersecting grooves (recessed portion 2) are formed on the surface of the magnetic recording medium substrate 1, and lattice patterns are formed by the grooves. As described above, the grooves formed on the surface of the magnetic recording medium substrate 1 allow a recessed portion 2 and protruding portion 3 to be formed on the substrate surface. The number of the grooves and space intervals therebetween can be adjusted depending on the conditions such as the size of the substrate and material of the magnetic layer. Further, the grooves can be designed in a geometrically patterned structure such as a radial pattern, concentric pattern or honeycomb pattern, in addition to a lattice pattern. Further, it can be a pattern composed in a combination of a plurality of shapes.

As shown in the cross sectional view of FIG. 2, the recessed portions 2 and the protruding portions 3 are provided on the surface of the magnetic recording medium substrate 1 at predetermined space intervals. In this embodiment, the protruding portion 3 is used as the recording area. A magnetic layer is formed on the protruding portion 3, whereby a magnetic recording medium is formed. The cross sectional view of FIG. 2 shows a part of the magnetic recording medium substrate 1.

The width of the protruding portion 3 used as the recording area is equal to an integral multiple of the lattice constant of the unit lattice of a single crystal structure configuring the magnetic layer. To be more specific, when the width of the protruding portion 3 is a width d1, and the lattice constant of the unit lattice of the single crystal structure configuring the magnetic layer is a width d2, the following relationship holds:

Width $d1$=width $d2 \times n$ (where $n$ is a positive integer)

When a magnetic layer is formed of magnetic crystal particles of a rectangular parallelepiped shape, the axis of easy magnetization of the magnetic particles (the lattice direction where the characteristics of the magnet are easily exhibited actually) is arranged in the direction where the direction of magnetization is desired to be arraigned, assuming that the lattice constant is a, b and c (a=b=c for a cubic crystal). For example, in the case of an in-plane recording medium, magnetic crystal particles are arranged with the axis of easy magnetization arraigned arraigned in the horizontal direction (preferably in the circumferential direction). In the case of a vertical recording medium, magnetic crystal particles are arranged with the axis of easy magnetization arraigned in the vertical direction. For example, in the case of vertical recording medium, when the axis of easy magnetization is assumed in the lattice direction of c-axis, the protruding portion 3 is only required to have an integral multiple of the a-axis constant and an integral multiple of the b-axis constant.

The material of the magnetic layer formed on the surface of the magnetic recording medium substrate 1 is exemplified by a Co-based alloy, CoPt. When CoPt is used, the width d2 of the unit lattice (lattice constant) is 2.7 [Å]. Accordingly, the width d1 of the protruding portion 3 as the recording area is 54 [Å], an integral multiple of the width d2.

When forming a magnetic layer, it is preferred to control the filming temperature, pressure (degree of vacuum) and the vapor deposition output of sputtering or CVD, so that the magnetic layer is formed at a high degree of vacuum and a low output.

To ensure that the magnetic layer formed on the protruding portion 3 will grow independently of the magnetic layer formed on the side wall surface or bottom surface of the recessed portion 2, the depth of the groove (recessed portion 2) is preferably equal to or greater than 1.2 times the thickness of the magnetic layer to be formed on the protruding portion 3.

(Magnetic Recording Medium)

Figure 3:
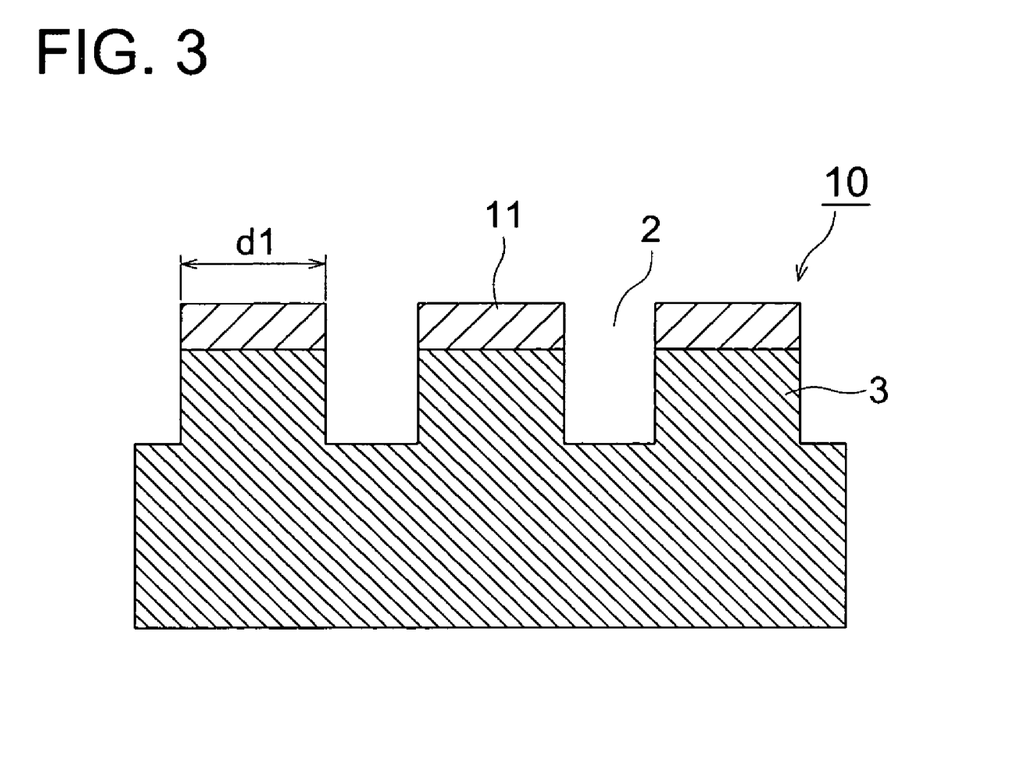
FIG. 3 shows a cross sectional view of the magnetic recording medium according to the first embodiment of the present invention.
Figure 4A:
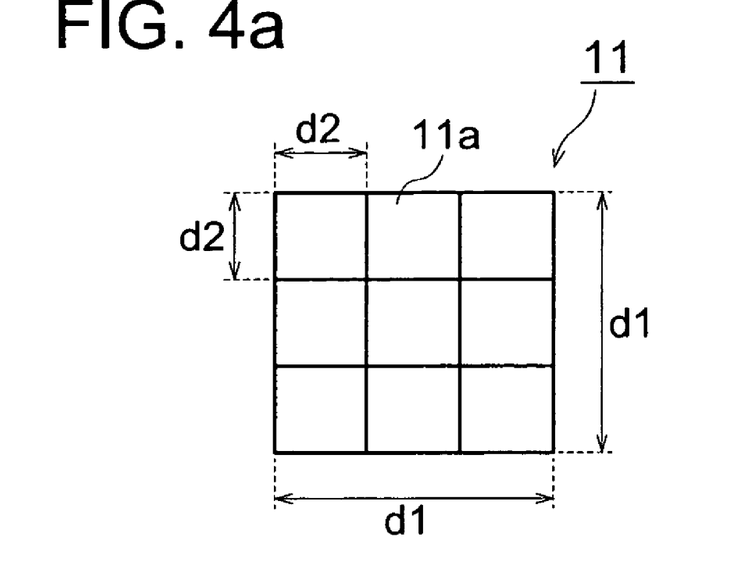
FIGS. 4a and 4b show a top view representing the relationship between the unit lattice of the single crystal structure of a magnetic layer and a recording area of a magnetic recording medium substrate.
Figure 4B:
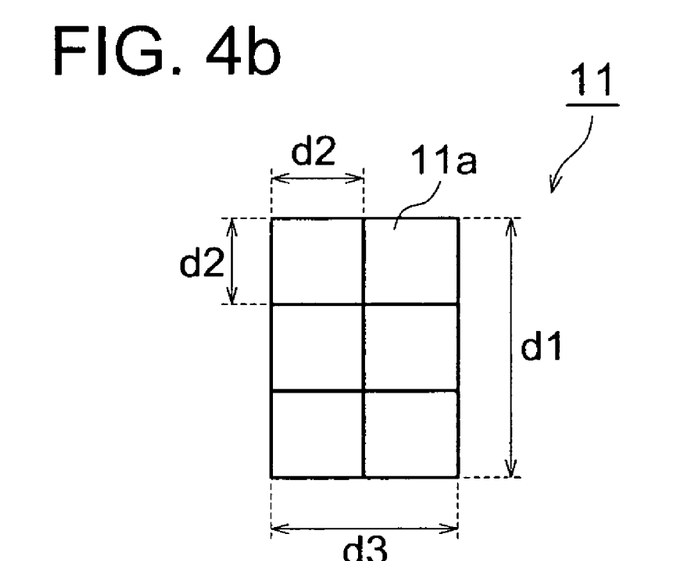

The following describes the magnetic recording medium using the magnetic recording medium substrate 1 with reference to FIGS. 3 and 4. FIG. 3 shows a cross sectional view of the magnetic recording medium according to the first embodiment of the present invention. FIGS. 4a and 4b show a top view representing the relationship between the unit lattice of the single crystal structure of a magnetic layer and the recording area of a magnetic recording medium substrate.

When manufacturing a magnetic recording medium using this magnetic recording medium substrate 1, a magnetic layer of Co-based alloy or the like is formed on the surface of the magnetic recording medium substrate 1 using sputtering or other method, whereby a magnetic recording medium is manufactured. For example, as shown in the cross sectional view of FIG. 3, a magnetic layer 11 is formed on the protruding portion 3 of the magnetic recording medium substrate 1, whereby the magnetic recording medium 10 is manufactured. The magnetic recording medium 10 can be formed by filling the recessed portion 2 of the magnetic recording medium substrate 1 with a non-magnetic substance.

Since the width d1 of the protruding portion 3 is an integral multiple of the width d2 (lattice constant) of a unit lattice, the magnetic layer 11 can be formed regularly on the protruding portion 3. In particular, the magnetic layer 11 can be regularly formed even on the end portions of the protruding portion 3.

For example, as shown in the top view of FIG. 4a, when the top surface of the protruding portion 3 is square and the width of one side is width d1, the width d1 is an integral multiple of the width d2 (lattice constant) of the unit lattice 11a of the magnetic layer 11. Accordingly, the unit lattices 11a of the magnetic layer 11 can be formed regularly on the protruding portion 3. In this case, the unit lattices 11a can be formed regularly even in the vicinity of the end on the top surface of the protruding portion 3.

Further, even when the top surface of the protruding portion 3 is formed in a rectangular shape, the magnetic layer 11 can be formed regularly on the protruding portion 3, provided that the width of the protruding portion 3 is the integral multiple of the width of the unit lattice 11a of the magnetic layer 11. For example, as shown in the top view of FIG. 4b, assume that the top surface of the protruding portion 3 is formed in a rectangular shape, the width of one side is d1, and the width of the other side is d3. In this case, when the width d1 and width d3 are both equal to an integral multiple of the width d2 of the unit lattice 11a, the unit lattice 11a of the magnetic layer 11 can be regularly formed on the protruding portion 3.

(Substrate Material)

The following describes the material of the magnetic recording medium substrate 1: The material of the magnetic recording medium substrate 1 is exemplified by resin, metal, oxide, semiconductor, sulfide, ceramic, glass, glass ceramic and organic/inorganic composite materials.

The following describes an example of using resin as the substrate material. Various forms of resin can be used as the material for the magnetic recording medium substrate 1, in addition to thermoplastic resin, thermosetting resin and actinic radiation curable resin.

As the thermoplastic resin of the magnetic recording medium substrate 1, there can be used, for example, polycarbonate, polyether ether ketone resin (PEEK resin), annular polyolefin resin, methacryl styrene (MS resin), polystyrene resin (PS resin), polyether imide (PEI resin), ABS resin, polyester resin (PET resin, PBT resin, etc.), polyolefin resin (PE resin, PP resin, etc.), polysulfone resin, polyether sulfone resin (PES resin), polyarylate resin, polyphenylene sulfide resin, polyamide resin, or acryl resin. Alternatively, as the thermosetting resin, phenol resin, urea resin, unsaturated polyester resin (BMC resin, etc.), silicon resin, urethane resin, epoxy resin, polyimide resin, polyamide imide resin, or polybenzoimidazole resin can be used. In addition, polyethylene naphthalene resin (PEN resin) and others can also be used.

Otherwise, UV curable resin can be used as the actinic radiation curable resin. The actinic radiation curable resin is exemplified by UV curable acryl urethane resin, UV curable polyester acrylate resin, UV curable epoxy acrylate resin, UV curable polyol acrylate resin, UV curable epoxy resin, UV curable silicon resin and UV curable acryl resin.

To ensure effective achievement of the object of the present invention, when curing by applying actinic radiation to the coated but uncured layer, a photo-initiator is preferably used to accelerate curing reaction. In this case, a photosensitizer can be used in combination.

If oxygen in air suppresses the above-mentioned curing reaction, actinic radiation can be applied, for example, in the atmosphere of inert gas, in order to reduce the oxygen concentration or to remove the oxygen. As the actinic radiation, infrared ray, visible ray or ultraviolet ray can be selected as appropriate. Selection of ultraviolet ray is particularly preferred, without the actinic radiation being restricted thereto. Further, curing reaction can be accelerated by heating during the application of the actinic radiation or before and after the application of the actinic radiation.

Liquid crystal polymer or organic/inorganic hybrid resin (e.g., polymeric components incorporating silicon as an aggregate) can be used for the magnetic recording medium substrate 1. It should be noted that these resins are only examples of the resins usable for the magnetic recording medium substrate 1. The resins that can be used for the magnetic recording medium substrate 1 are not restricted thereto. Two or more resins can be used in a mixed form, or different components can be used in separate layers adjacent to each other.

The resin used as the base material preferably has a higher heat resistant temperature or glass-transition temperature Tg wherever possible. A magnetic layer is formed on the magnetic recording medium substrate 1 by sputtering, and therefore, heat resistant temperature or glass-transition temperature Tg is preferably equal to or higher than the temperature at which the sputtering is conducted. For example, the resin having the heat resistant temperature or glass-transition temperature Tg equal to or higher 200° C. is preferably used.

The typical examples of the resins having a glass-transition temperature Tg of 200° C. or more include polyether sulfone resin (PES resin), polyether imide resin (PEI resin), polyamide imide resin, polyimide resin, polybenzoimidazole resin, BMC resin, and liquid crystal polymer. To put it more specifically, the polyether sulfone resin (PES resin) is exemplified by Udel (Solvay Advanced Polymers). The polyether imide resin (PEI resin) is exemplified by Ultem (by Japan GE Plastic Co., Ltd.). The polyamide imide resin is exemplified by Torlon (Solvay Advanced Polymers). The polyimide resin (thermoplastic resin) is exemplified by Oram (by Mitsui Chemical Co., Ltd.). The polyimide resin (thermosetting resin) is exemplified by Eupirex (by Ube Industries, Ltd.). The polybenzoimidazole resin is exemplified by PBI/Celazole (by Clariant Japan). The liquid crystal polymer is exemplified by Sumika Super LCP (by Sumitomo Chemical Co., Ltd.). The polyether ether ketone is exemplified by Victorex (by Victorex MC).

To avoid misalignment of the magnetic head due to the change in the dimensions of the substrate caused by moisture absorption, use of the resin with low moisture absorption characteristics is preferably used for the magnetic recording medium substrate 1. The resin with low moisture absorption characteristics is exemplified by polycarbonate or annular polyolefin resin.

The above description assumes the examples where the substrate is made of a single resin. However, the substrate is not restricted to the one made of a single resin. The substrate can be made by covering the surface of a non-magnetic substance such as metal or glass with a resin layer. In this case, the non-magnetic substance to be covered with resin can be resin, metal, semiconductor, nitride, sulfide, ceramic, glass, glass ceramic, organic/inorganic composite materials, and other various forms of materials that can be used as a substrate.

The substrate made of a single resin is preferable because it provides an advantage of simplifying the manufacturing process.

(Manufacturing Method)

The resin-made magnetic recording medium substrate 1 can be manufactured by such a molding method as injection molding, cast molding, sheet molding, injection compression molding and compression molding method, using a die having the shape conforming to the magnetic recording medium substrate 1. To be more specific, the magnetic recording medium substrate 1 is manufactured with the injection molding method or the like, using a die having the shape conforming to the recessed portions 2 and protruding portions 3 of the magnetic recording medium substrate 1. Further, as required, the substrate having been molded can be cut, stamped or pressed, whereby a magnetic recording medium substrate 1 can be manufactured.

When the magnetic recording medium substrate 1 is molded using above-mentioned injection molding method or the like, it is possible to simultaneously form at least one of the followings: the inner and outer diameters of the magnetic recording medium substrate 1, the contour of the inner periphery, and the contour of the outer periphery. To put it another way, when the die used for injection molding process is produced in conformity to the dimensions of the inner or outer periphery of the magnetic recording medium substrate 1, the inner and outer diameters will be formed at the time of resin molding. Further, when a die produced in conformity to the shapes of the inner or outer periphery is used, the shapes of the ends of inner and outer peripheries are formed at the time of resin molding.

The magnetic recording medium substrate 1 of this embodiment can be manufactured by a method other than the molding method. For example, a resist is provided on a substrate and a pattern is formed on the resist by the mask conforming to the recessed portion 2 (groove). This is irradiated with an excimer laser, whereby the recessed portion 2 (groove) can be formed. After that, the resist on the substrate is removed to complete the production of the magnetic recording medium substrate 1. The magnetic recording medium substrate 1 can be manufactured by the above-mentioned patterning process. Further, after a pattern has been formed on the substrate by resist, the recessed portion 2 (groove) can be formed by dry etching.

The recessed portion 2 (groove) can be formed on the substrate by the printing method or nano-imprinting method.

The error of the width d1 of the protruding portion 3 is preferably equal to or less than 3% of the lattice constant (width d2)×n, more preferably equal to or less than 2% the lattice constant (width d2)×n. This error will be reflected into the amount of the lattice distortion of the magnetic layer to be formed on the protruding portion 3, and therefore, is preferably equal to or less than 3%.

Further, a coated layer can be formed on the surface of the magnetic recording medium substrate 1, and a magnetic layer can be formed on the coated layer. A metallic layer, ceramic layer, magnetic layer, glass layer or inorganic/organic composite layer (hybrid layer) can be used as the coated layer. In the vertical magnetic recording medium greatly expected to make a significant contribution to higher density technology, magnetic substances are required to be arranged in the direction perpendicular to the substrate surface. For this reason, a soft magnetic layer must be provided between the magnetic layer and the substrate. A typical alloy for this soft magnetic layer is a nickel-cobalt (Ni—Co) alloy. A Ni—Co alloy used as the coated layer can function as a soft magnetic layer for the vertical magnetic recording medium.

Embodiment 2

Figure 5:
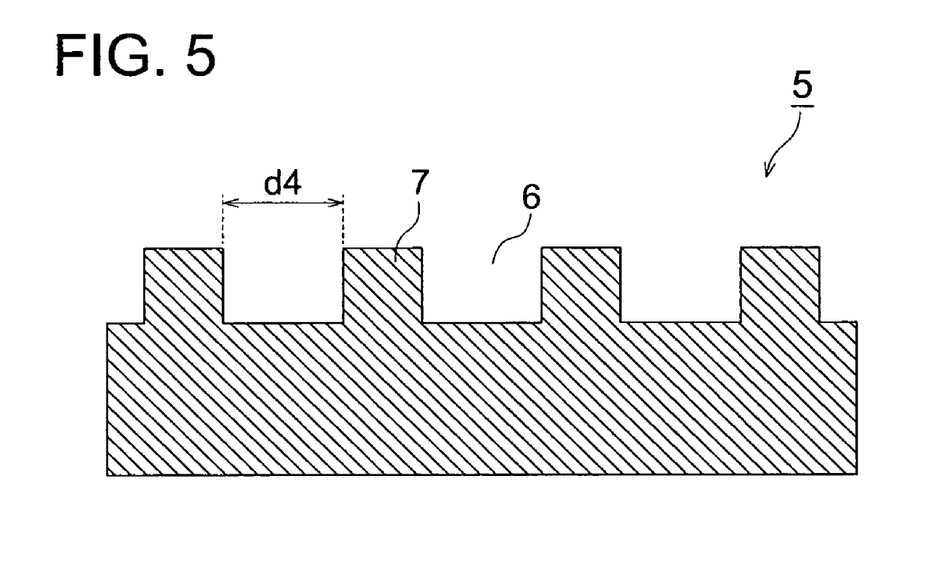
FIG. 5 shows a cross sectional view of the magnetic recording medium substrate according to a second embodiment of the present invention.
Figure 6:
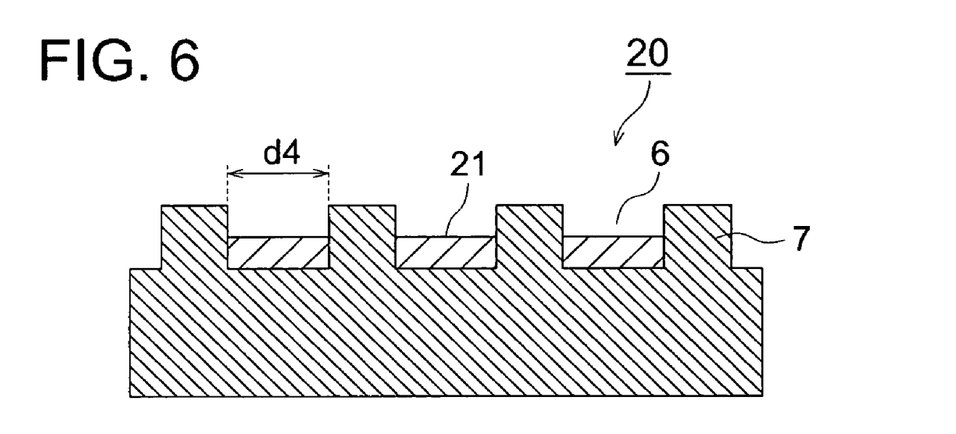
FIG. 6 shows a cross sectional view of the magnetic recording medium according to a second embodiment of the present invention.

Referring to FIGS. 5 and 6, and using an example of the magnetic recording medium substrate whose base material is made of resin, the following describes the magnetic recording medium substrate as a second embodiment of the present invention. FIG. 5 is a cross sectional view of the magnetic recording medium substrate as the second embodiment of the present invention, and FIG. 6 is a cross sectional view of the magnetic recording medium as the second embodiment of the present invention.

In the first embodiment, the protruding portion of the magnetic recording medium substrate is assumed as a recording area, and a magnetic layer is formed on the protruding portion. In the second embodiment, however, the recessed portion is used as the recording area and a magnetic layer is formed on the recessed portion. For example, as shown in FIG. 5, a groove is formed on the surface of the magnetic recording medium substrate 5, whereby a recessed portion 6 and protruding portion 7 are formed on the surface of the substrate. A magnetic layer is formed on the recessed portion 6, whereby a magnetic recording medium is manufactured. The cross sectional view of FIG. 5 shows part of the magnetic recording medium substrate 5.

The width of the recessed portion 6 used as the recording area is an integral multiple of the lattice constant of the unit lattice of the single crystal structure constituting the magnetic layer. To put it another way, assume that the width of the recessed portion 6 is a width d4 and a width (lattice constant) of the unit lattice of the single crystal structure configuring the magnetic layer is d2. Then the following relationship holds:

Width $d4 = $ width $d2 \times n$ (where $n$ is a positive integer)

(Magnetic Recording Medium)

When a magnetic recording medium is manufactured using the magnetic recording medium substrate 5, a magnetic layer of Co-based alloy is formed on the surface of the magnetic recording medium substrate 5 by sputtering method or the like, and a magnetic recording medium is thus produced. For example, as shown in FIG. 6, the magnetic layer 21 is formed on the recessed portion of the magnetic recording medium substrate 5, a magnetic recording medium 20 is thus produced.

Since the width d4 of the recessed portion 6 is an integral multiple of the width d2 (lattice constant) of a unit lattice, the magnetic layer 21 can be formed regularly on the recessed portion 6. The magnetic layer 21 can be regularly formed even on the end of the recessed portion 6.

In the above-mentioned first embodiment and second embodiment, a groove is formed only on one side of the substrate. However, grooves can be formed on both sides as well. In this case, either the protruding portion or recessed portion is used as a recording area. When the width of the protruding portion or recessed portion used as a recording area is an integral multiple of the width (lattice constant) of the unit lattice of the single crystal structure constituting the magnetic layer, the same advantages as those of the first and second embodiments are ensured.

The side surfaces of the groove can be formed in a vertical direction or in a slanting direction. The side surfaces of the groove can be formed in a linear or curved shape.

In the above-mentioned first embodiment and second embodiment, the protruding portion or recessed portion used as the recording area is rectangular. The protruding portion or recessed portion can be triangular or pentagonal or more, depending on the structure of the unit lattice of the single crystal structure constituting the magnetic layer.

EXAMPLE

The following describes the examples of the embodiments of the present invention:

Example 1

A specific example of the magnetic recording medium substrate 1 shown in FIGS. 1 through 3 will be described as a first example. In the first example, the protruding portion 3 of the magnetic recording medium substrate 1 shown in FIGS. 1 through 3 was assumed as the recording area, and a magnetic layer was formed on the protruding portion 3. As shown in FIG. 4a, the top surface of the protruding portion 3 was made square.

(Forming Magnetic Recording Medium Substrate 1)

A magnetic recording medium substrate 1 was manufactured by injection molding, using polyimide as the substrate material. Oram (by Mitsui Chemical) was used as the polyimide. The following describes the dimensions of the magnetic recording medium substrate 1.

Outer diameter: 1 inch (25.4 mm)
Thickness of the magnetic recording medium substrate 1: 0.4 mm
Width d1 of the protruding portion 3: 88 Å
Width of the recessed portion 2: 200 Å
(Forming Magnetic Layer)
A magnetic layer of CoPd alloy was formed on the surface of the magnetic recording medium substrate 1 by sputtering, whereby a magnetic recording medium was produced.
Thickness of magnetic layer: 26 nm
Width d2 (lattice constant) (111) of the unit lattice of the single crystal structure constituting the magnetic layer: 2.2 Å
(Evaluation)

In this first example, the width d1 of the protruding portion 3 as the recording area is 88 Å, and the width d2 (lattice constant) of the unit lattice is 2.2 Å. Accordingly, width d1 is an integral multiple of the width d2. This makes it possible to form a magnetic layer regularly on the protruding portion 3. The magnetic layer can be regularly formed even on the end of the protruding portion 3. For example, the degree of crystallinity and distortion were checked by electron diffraction measurement. This measurement has demonstrated that a magnetic layer was formed regularly on the protruding portion 3.

Example 2

In this second example, similarly to the case of the first example, the protruding portion 3 of the magnetic recording medium substrate 1 was assumed as the recording area, and a magnetic layer was formed on the protruding portion 3. In the second example, as shown in FIG. 4b, the top surface of the protruding portion 3 was rectangular. The same resin (polyimide) as that of the first example was used for the magnetic recording medium substrate 1 in the second example.

(Dimensions of Magnetic Recording Medium Substrate 1)
Outer diameter: 1 inch (25.4 mm)
Thickness of the magnetic recording medium substrate 1: 0.4 mm
Width d1 of the protruding portion 3 (recording area): 81 Å
Width d3 of the protruding portion 3 (recording area): 108 Å
(How to Form Magnetic Layer)
A magnetic layer of CoPt alloy was formed on the surface of the magnetic recording medium substrate 1 by sputtering, whereby a magnetic recording medium was produced.
Thickness of Magnetic Layer: 30 nm
Width d2 (lattice constant) of the unit lattice of the single crystal structure constituting the magnetic layer: 2.7 Å
(Evaluation)

In this second example, the width d1 of the protruding portion 3 as the recording area is 81 Å, the width d3 is 108 Å, and the width d2 (lattice constant) of the unit lattice is 2.7 Å. Accordingly, width d1 and width d3 are an integral multiple of the width d2. This makes it possible to form a magnetic layer regularly on the protruding portion 3.

Example 3

In this third example, similarly to the case of the first example, the protruding portion 3 of the magnetic recording medium substrate 1 was assumed as the recording area, and a magnetic layer was formed on the protruding portion 3. In the third example, as shown in FIG. 4a, the top surface of the protruding portion 3 was square. In this third example, the material of the magnetic layer was different. The same resin (polyimide) as that of the first example was used for the magnetic recording medium substrate 1 in the third example.

(Dimensions of Magnetic Recording Medium Substrate 1)
Outer diameter: 1 inch (25.4 mm)
Thickness of magnetic recording medium substrate 1: 0.4 mm
Width d1 of the protruding portion 3 (recording area): 48 Å
(How to Form Magnetic Layer)
A magnetic layer of CoCrPt alloy was formed on the surface of the magnetic recording medium substrate 1 by sputtering, whereby a magnetic recording medium was produced.
Thickness of the magnetic layer: 20 nm
Width d2 (lattice constant) of the unit lattice of the single crystal structure constituting the magnetic layer: 2.4 Å
(Evaluation)

In this third example, the width d1 of the protruding portion 3 as the recording area is 48 Å, and the width d2 (lattice constant) of the unit lattice is 2.4 Å. Accordingly, width d1 is an integral multiple of the width d2. This makes it possible to form a magnetic layer regularly on the protruding portion 3.

Comparative Example

The following describes a comparative example to the above-mentioned first through third examples. In this comparative example, similarly to the case of the above-mentioned first through third examples, a groove is formed on the surface of the magnetic recording medium substrate, whereby a recessed portion and a protruding portion were formed. The same resin (polyimide) as that of the first example was used as the material of the magnetic recording medium substrate of the comparative example.

(Dimensions of Magnetic Recording Medium Substrate of the Comparative Example)

Outer diameter: 1 inch (25.4 mm)

Thickness of magnetic recording medium substrate: 0.4 mm

Width of protruding portion (recording area): 40 Å

(How to Form Magnetic Layer)

A magnetic layer of CoPt alloy was formed on the surface of the magnetic recording medium substrate by sputtering, whereby a magnetic recording medium was produced.

Width (lattice constant) of the unit lattice of the single crystal structure constituting the magnetic layer: 2.7 Å

(Evaluation)

In this comparative example, the width of the protruding portion as the recording area is 40 Å, and the width (lattice constant) of the unit lattice is 2.7 Å. Accordingly, the width of the protruding portion is not an integral multiple of the width (lattice constant) of the unit lattice, and therefore, a magnetic layer is irregularly formed on the protruding portion. Distortion is likely to occur particularly on the end portion of the protruding portion.

As described above, when using the magnetic recording medium substrate according to the embodiments of the present invention, a regularized magnetic layer can be formed on the recording area without using any complicated process. This arrangement ensures formation of a magnetic layer, almost completely eliminating the possibility of distortion or other defects, and improves the magnetic properties of a magnetic recording medium.

In the above-mentioned embodiments, polyimide is used as the material of a magnetic recording medium substrate 1. However, resins other than the resins mentioned in the above-mentioned embodiments can also be used to get the same advantages.

In above-mentioned embodiments, the magnetic layer is formed on the protruding portion 3 of the magnetic recording medium substrate 1 in the first embodiment. However, it has been observed that a magnetic layer was regularly formed on the recessed portion 6, even when a magnetic layer is formed on the recessed portion 6 of the magnetic recording medium substrate 5 in the second embodiment.

The invention claimed is:

1. A disk-shaped magnetic recording medium substrate, comprising:
    a plurality of recording areas formed on a surface of the recording medium substrate, a magnetic layer being formed in each of the recording areas, and
    wherein the surface has grooves formed thereon, the recording areas are provided only on recessed portions of the grooves, the recessed portions have a width of an integral multiple of a lattice constant of a unit lattice of a single crystal structure constituting the magnetic layer, and the recording areas have a width equal to the integral multiple of the lattice constant.

2. The disk-shaped magnetic recording medium substrate of claim 1, wherein the grooves are formed in a combination of identical geometric shapes or a combination of a plurality of geometric shapes.

3. The disk-shaped magnetic recording medium substrate of claim 2, wherein the combination of geometric shapes is a pattern selected from the group of patterns consisting of a lattice pattern, a radial pattern, a concentric pattern and a honeycomb pattern.

4. The disk-shaped magnetic recording medium substrate of claim 1, wherein the recording areas are formed by a molding method.

5. The disk-shaped magnetic recording medium substrate of claim 1, wherein the recording areas are formed by patterning.

6. The disk-shaped magnetic recording medium substrate of claim 1, wherein a base material of the substrate is composed of material selected from the group of materials consisting of resin, glass, metal, semiconductor, oxide, nitride, and sulfide.

7. A disk-shaped magnetic recording medium substrate, comprising:
    a plurality of recording areas formed on a surface of the recording medium substrate, a magnetic layer being formed in each of the recording areas, and
    wherein the surface has grooves formed thereon, the recording areas are provided only on protruding portions of the grooves, the protruding portions have a width of an integral multiple of a lattice constant of a unit lattice of a single crystal structure constituting the magnetic layer, and the recording areas have a width equal to the integral multiple of the lattice constant.

8. The disk-shaped magnetic recording medium substrate of claim 7, wherein the grooves are formed in a combination of identical geometric shapes or a combination of a plurality of geometric shapes.

9. The disk-shaped magnetic recording medium substrate of claim 8, wherein the combination of geometric shapes is a pattern selected from the group of patterns consisting of a lattice pattern, a radial pattern, a concentric pattern and a honeycomb pattern.

10. The magnetic recording medium of claim 7, wherein the recording areas are formed by a molding method.

11. The magnetic recording medium of claim 7, wherein the recording areas are formed by patterning.

12. The magnetic recording medium of claim 7, wherein a base material of the substrate is composed of material selected from the group of materials consisting of resin, glass, metal, semiconductor, oxide, nitride, and sulfide.

13. A method for manufacturing a disk-shaped magnetic recording medium substrate, the method comprising the step of:
    forming a plurality of recording areas on a surface of the recording medium substrate by forming a plurality of grooves in the surface of the recording medium substrate, wherein a magnetic layer is to be formed in each of the recording areas which are provided only on recessed portions of the grooves, and
    wherein the recessed portions of the grooves have a width equal to an integral multiple of a lattice constant of a unit lattice of a single crystal structure constituting the magnetic layer, and the recording areas have a width equal to the integral multiple of the lattice constant.

14. A method for manufacturing a magnetic recording medium, the method comprising the steps of:
    forming a plurality of recording areas on a surface of a disc-shaped recording medium substrate by forming a plurality of grooves in the surface of the recording medium substrate;
    forming a magnetic layer in each of the recording areas which are provided only on recessed portions of the grooves, and
    wherein the recessed portions have a width equal to an integral multiple of a lattice constant of a unit lattice of a single crystal structure constituting the magnetic layer, and the recording areas have a width equal to the integral multiple of the lattice constant.

15. A magnetic recording medium, comprising:
- a disk-shaped magnetic recording medium substrate, including:
    - a plurality of recording areas formed on a surface of the recording medium substrate; and
    - a magnetic layer formed in each of the recording areas,
- wherein the surface has grooves formed thereon, the recording areas are provided only on recessed portions of the grooves, the recessed portions have a width of an integral multiple of a lattice constant of a unit lattice of a single crystal structure constituting the magnetic layer, and the recording areas have a width equal to the integral multiple of the lattice constant.

16. The magnetic recording medium of claim 15, wherein the grooves are formed in a combination of identical geometric shapes or a combination of a plurality of geometric shapes.

17. The magnetic recording medium of claim 16, wherein the combination of geometric shapes is a pattern selected from the group of patterns consisting of a lattice pattern, a radial pattern, a concentric pattern and a honeycomb pattern.

18. The magnetic recording medium of claim 15, wherein the recording areas are formed by a molding method.

19. The magnetic recording medium of claim 15, wherein the recording areas are formed by patterning.

20. The magnetic recording medium of claim 15, wherein a base material of the substrate is composed of material selected from the group of materials consisting of resin, glass, metal, semiconductor, oxide, nitride, and sulfide.

21. A magnetic recording medium, comprising:
- a disk-shaped magnetic recording medium substrate, including:
    - a plurality of recording areas formed on a surface of the recording medium substrate; and
    - a magnetic layer formed in each of the recording areas,
- wherein the surface has grooves formed thereon, the recording areas are provided only on protruding portions of the grooves, and the protruding portions have a width of an integral multiple of a lattice constant of a unit lattice of a single crystal structure constituting the magnetic layer, and the recording areas have a width equal to the integral multiple of the lattice constant.

22. The magnetic recording medium of claim 21, wherein the grooves are formed in a combination of identical geometric shapes or a combination of a plurality of geometric shapes.

23. The magnetic recording medium of claim 22, wherein the combination of geometric shapes is a pattern selected from the group of patterns consisting of a lattice pattern, a radial pattern, a concentric pattern and a honeycomb pattern.

24. The magnetic recording medium of claim 21, wherein the recording areas are formed by a molding method.

25. The magnetic recording medium of claim 21, wherein the recording areas are formed by patterning.

26. The magnetic recording medium of claim 21, wherein a base material of the substrate is composed of material selected from the group of materials consisting of resin, glass, metal, semiconductor, oxide, nitride, and sulfide.

27. A method for manufacturing a disk-shaped magnetic recording medium substrate, the method comprising the step of:
- forming a plurality of recording areas on a surface of the recording medium substrate by forming a plurality of grooves in the surface of the recording medium substrate, wherein a magnetic layer is formed in each of the recording area, which are provided only on protruding portions of the grooves, and
- wherein the protruding portions of the grooves have a width equal to an integral multiple of a lattice constant of a unit lattice of a single crystal structure constituting the magnetic layer, and the recording areas have a width equal to the integral multiple of the lattice constant.

28. A method for manufacturing a magnetic recording medium, the method comprising the steps of:
- forming a plurality of recording areas on a surface of a disc-shaped recording medium substrate by forming a plurality of grooves in the surface of the recording medium substrate; and
- forming a magnetic layer in each of the recording areas, which are provided only on protruding portions of the grooves,
- wherein the protruding portions have a width equal to an integral multiple of a lattice constant of a unit lattice of a single crystal structure constituting the magnetic layer, and the recording areas have a width equal to the integral multiple of the lattice constant.

* * * * *